US012292715B2

(12) United States Patent
Favre et al.

(10) Patent No.: US 12,292,715 B2
(45) Date of Patent: May 6, 2025

(54) TIMEPIECE ASSEMBLY COMPRISING A WATCH AND A SYSTEM FOR CORRECTING THE TIME

(71) Applicant: The Swatch Group Research and Development Ltd, Marin (CH)

(72) Inventors: Jérôme Favre, Neuchâtel (CH); Jean-Jacques Born, Morges (CH); Matthias Imboden, St-Blaise (CH); Cédric Nicolas, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 373 days.

(21) Appl. No.: 17/820,093

(22) Filed: Aug. 16, 2022

(65) Prior Publication Data

US 2023/0132978 A1 May 4, 2023

(30) Foreign Application Priority Data

Oct. 29, 2021 (EP) .................................... 21205505

(51) Int. Cl.
*G04C 11/08* (2006.01)
*G04C 3/06* (2006.01)

(52) U.S. Cl.
CPC .............. *G04C 11/084* (2013.01); *G04C 3/06* (2013.01)

(58) Field of Classification Search
CPC ...... G04C 11/084; G04C 3/06; G04D 7/1271; G04D 7/004; G04D 7/1292; G04B 27/007
(Continued)

(56) References Cited

U.S. PATENT DOCUMENTS 10,001,753 B2 6/2018 Winkler et al.
11,327,440 B2 5/2022 Tombez et al.
(Continued)

FOREIGN PATENT DOCUMENTS

CH 714264 A2 * 4/2019 ............. A45C 11/10
CN 108153135 A 6/2018
(Continued)

OTHER PUBLICATIONS

Chinese Office Action issued Mar. 1, 2024 in Chinese Patent Application No. 202211335244.6, 7 pages.
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A timepiece assembly includes a watch having a mechanical movement and an analogue time display, the running of which is set by a mechanical resonator, and a support for the watch. To correct a time displayed by the analogue display, the timepiece assembly includes a correction system which is formed by a mechanical device incorporated into the watch and by an electrical device incorporated into the support. The mechanical device includes a magnet supported by an elastic blade and is arranged in the watch to brake the oscillating mechanical resonator, for example by applying periodic braking, or to momentarily stop its oscillation by exerting a magnetic force on the magnet with a magnetic field produced by a coil of the electrical device and passing through the case of the watch, to carry out essentially a set correction of the time displayed.

10 Claims, 3 Drawing Sheets

(58) Field of Classification Search
USPC .......................................................... 368/158
See application file for complete search history.

(56) References Cited

U.S. PATENT DOCUMENTS

| | | | | |
|---|---|---|---|---|
| 2017/0351219 | A1 | 12/2017 | Paratte et al. | |
| 2018/0341225 | A1* | 11/2018 | Favre | A44C 5/0007 |
| 2019/0384228 | A1 | 12/2019 | Tombez | |
| 2020/0073331 | A1* | 3/2020 | Tombez | G04C 3/04 |
| 2020/0166894 | A1* | 5/2020 | Hinaux | G04B 5/02 |
| 2021/0191334 | A1* | 6/2021 | Surmely | G04B 17/063 |

FOREIGN PATENT DOCUMENTS

| | | | | |
|---|---|---|---|---|
| CN | 110955139 | A | 4/2020 | |
| EP | 3 001 259 | A1 | 3/2016 | |
| EP | 3 252 545 | A1 | 12/2017 | |
| EP | 3 584 645 | A1 | 12/2019 | |
| EP | 3 620 867 | A1 | 3/2020 | |
| EP | 3 629 104 | A1 | 4/2020 | |
| JP | 2021081418 | A * | 5/2021 | G04B 27/007 |
| WO | WO 2021/121711 | A1 | 6/2021 | |

OTHER PUBLICATIONS

European Search Report Issued Mar. 28, 2022 in European Application 21205505.7 Filed on Oct. 29, 2021, (with English Translation of Categories of Cited Documents), 3 pages

* cited by examiner

TIMEPIECE ASSEMBLY COMPRISING A WATCH AND A SYSTEM FOR CORRECTING THE TIME

CROSS-REFERENCE TO RELATED APPLICATION

This application claims priority to European Patent Application No. 21205505.7 filed on Oct. 29, 2021, the entire disclosure of which is hereby incorporated herein by reference.

TECHNICAL FIELD OF THE INVENTION

The invention relates to a watch, incorporating a mechanical movement provided with a mechanical oscillator, and a system for correcting the time displayed by the watch other than a mechanical control element, in particular a winder, operated by a user.

TECHNICAL BACKGROUND

Document WO2021/121711 describes a timepiece provided with a mechanical movement and incorporating a device for correcting the time displayed by the timepiece. The correction device is of the electronic type and comprises an electronic unit for receiving a correction signal, provided by a device external to the timepiece (in particular a mobile phone), an electromechanical actuator forming a braking device for the mechanical resonator incorporated into the mechanical movement, and an electronic unit for controlling the electromechanical actuator as a function of the correction signal received, this electronic unit being arranged in the timepiece.

Although the various embodiments of the timepiece disclosed in the aforementioned document are of great interest for correcting the time displayed by the timepiece easily and precisely without the user having to be aware of the exact current time and for setting the analogue display of this timepiece by conventional means, for example a winder which users have to actuate themselves, the invention described in document WO2021/121711 is disadvantageous for purists of fine watchmaking who consider that watches should be fully mechanical. Indeed, even if the invention described in the aforementioned document makes it possible advantageously not to have a battery or other rechargeable battery in the timepiece, as the electrical energy required can be supplied during each planned correction to a recharged power supply recharged by means of an external power supply, in particular by contactless means, the correction device incorporated in the timepiece still comprises electronic elements.

SUMMARY OF THE INVENTION

The objective of the present invention is to provide a timepiece assembly which makes it possible to correct the time displayed by a mechanical watch in a precise manner and/or to advance/turn back the time of the display by one hour when the clocks change in summer/winter without the user having to actuate a mechanical control member connected to the analogue time display.

For this purpose, the present invention relates to a timepiece assembly comprising a watch, formed by a case and a mechanical movement incorporated into the case, and a support which is external to the watch and arranged so as to be able to support at least the case of this watch, in particular a display case or a box. The mechanical movement comprises an analogue time display, a drive mechanism of this analogue time display and a mechanical oscillator, the mechanical resonator of which is formed by a balance wheel and an elastic return structure, this mechanical oscillator being arranged so as to be able to set the running of the drive mechanism. The timepiece assembly comprises a system for correcting a time displayed by the analogue display, this correction system being formed, on the one hand, by a mechanical device incorporated into the case and, on the other hand, by an electrical device incorporated into the support.

The mechanical device comprises a mobile magnetic element, in particular a magnet, which is configured and arranged in the watch such that the mechanical device can brake the oscillating mechanical resonator or momentarily stop an oscillation of the mechanical resonator by exciting the mobile magnetic element by a magnetic field, in particular by applying a magnetic force on the magnet by means of a magnetic field produced by the electrical device.

The electrical device comprises a magnetic field generator, this magnetic field generator and said case being arranged such that when the watch case is placed on the external support in a given position, a magnetic field produced by the magnetic field generator can pass through the case and reach the region where the mobile magnetic element is located and excite the latter so as to generate, via the mechanical device, braking pulses which are applied to the oscillating mechanical resonator or momentarily stop an oscillation of the mechanical resonator by the mechanical device.

The electrical device further comprises a control unit arranged so as to be able to produce an electric control signal as a function of a correction determined for the time displayed by the analogue display and provide this electric control signal to the magnetic field generator so that it generates a corresponding magnetic field which activates the mechanical device such that this mechanical device generates a series of braking pulses which are applied to the oscillating mechanical resonator or momentarily stop an oscillation of the mechanical resonator, so as to perform essentially the set correction of the displayed time.

Due to the advantageous features of the timepiece assembly according to the invention, it is possible to correct the time displayed by the watch or to set the analogue display to summer time or winter time on the planned date in a precise manner by taking care to place the watch case in a given position on the support associated with the watch. The setting of the correct time can be triggered automatically by closing a cover of the support or by pressing an activating button on the support or via any sensor associated with the support or possibly via a mobile phone which has an application used for sending a signal for activating the correction system to a receiver arranged in the support. The support is advantageously a box, a casket or a display case connected to the mains, or autonomous with batteries, or equipped with a solar power collector.

A major advantage of the invention is that no electrical element is required in the watch case, which can therefore be fully mechanical, i.e. without an electronic unit or other electrical device, the watch case incorporating a fully mechanical movement and a mechanical device comprising a mobile magnetic element, in particular a magnet. The electrical device of the correction system according to the invention is located outside the watch case and it is materially independent from the watch, such that the watch can be worn by a user without the electrical device, which remains connected to the external support on which the watch can be placed momentarily, in particular for at least part of the night.

BRIEF DESCRIPTION OF THE FIGURES

The invention is described in more detail in the following with reference to the accompanying drawings, given by way of non-limiting examples, in which.

DETAILED DESCRIPTION OF THE INVENTION

With reference to the figures, two embodiments of the timepiece assembly according to the invention will be described below.

Figure 1:
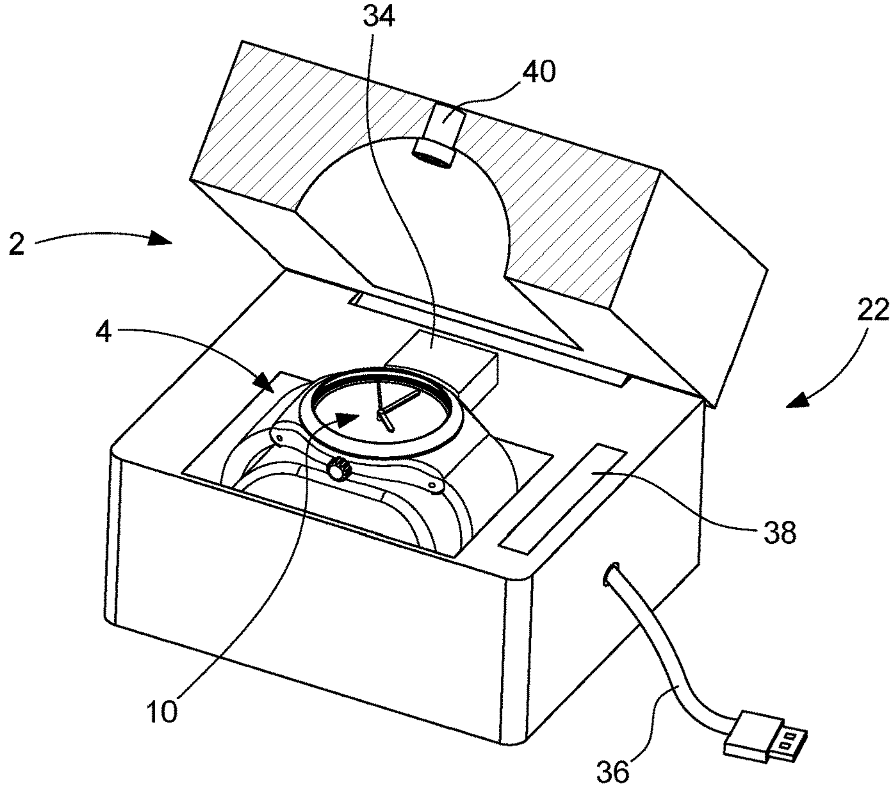
FIG. 1 shows in perspective a first embodiment of a timepiece assembly according to the invention.
Figure 2:
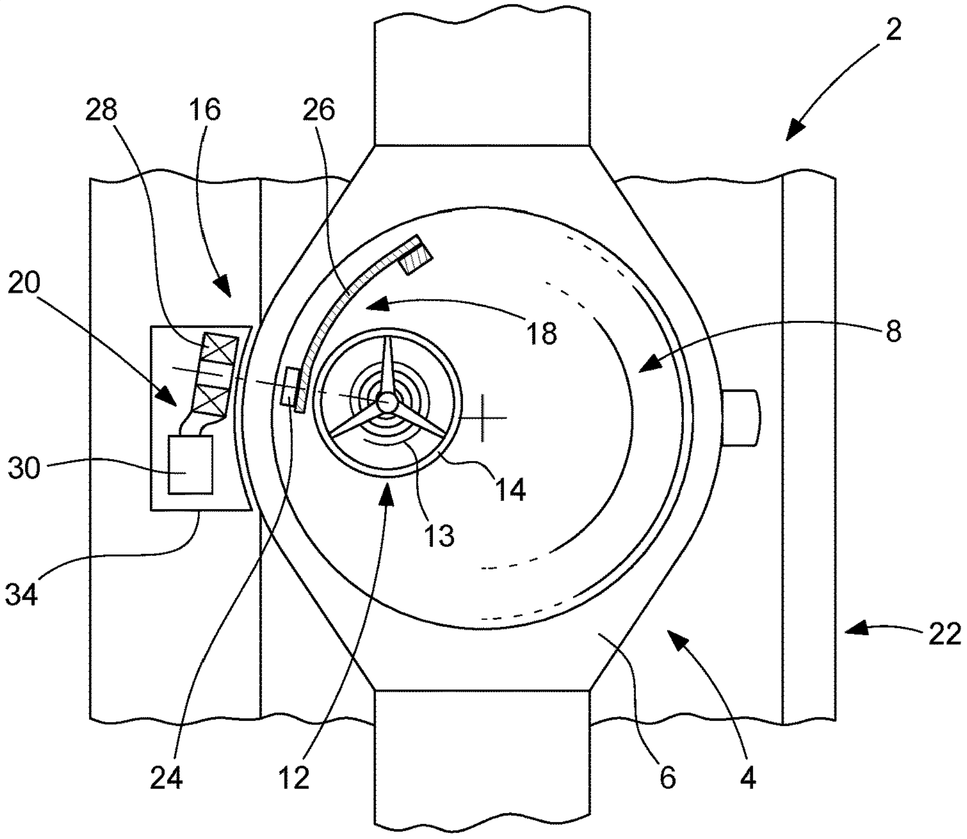
FIG. 2 is a simplified and partial representation, in horizontal cross-section, of the timepiece assembly of FIG. 1.
Figure 3:
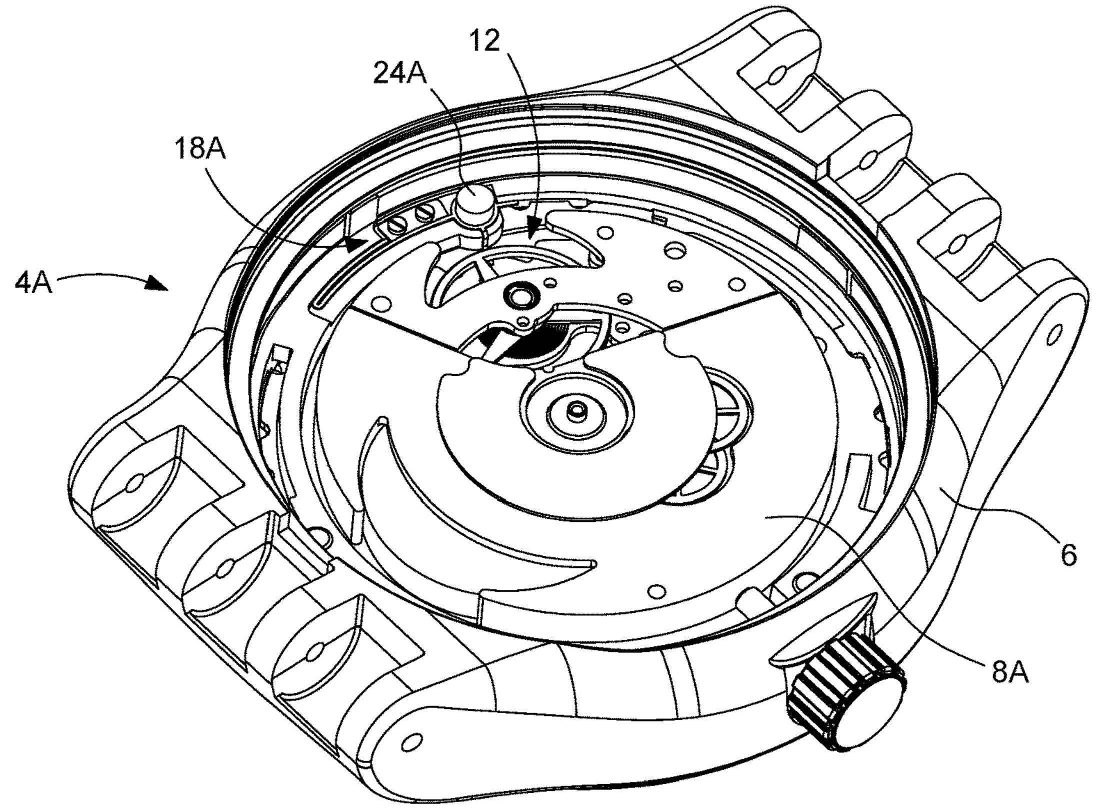
FIGS. 3 and 4 show the watch in perspective, with its back open, a second embodiment of a timepiece assembly according to the invention, FIG. 4 being a partial enlargement of FIG. 3.
Figure 4:
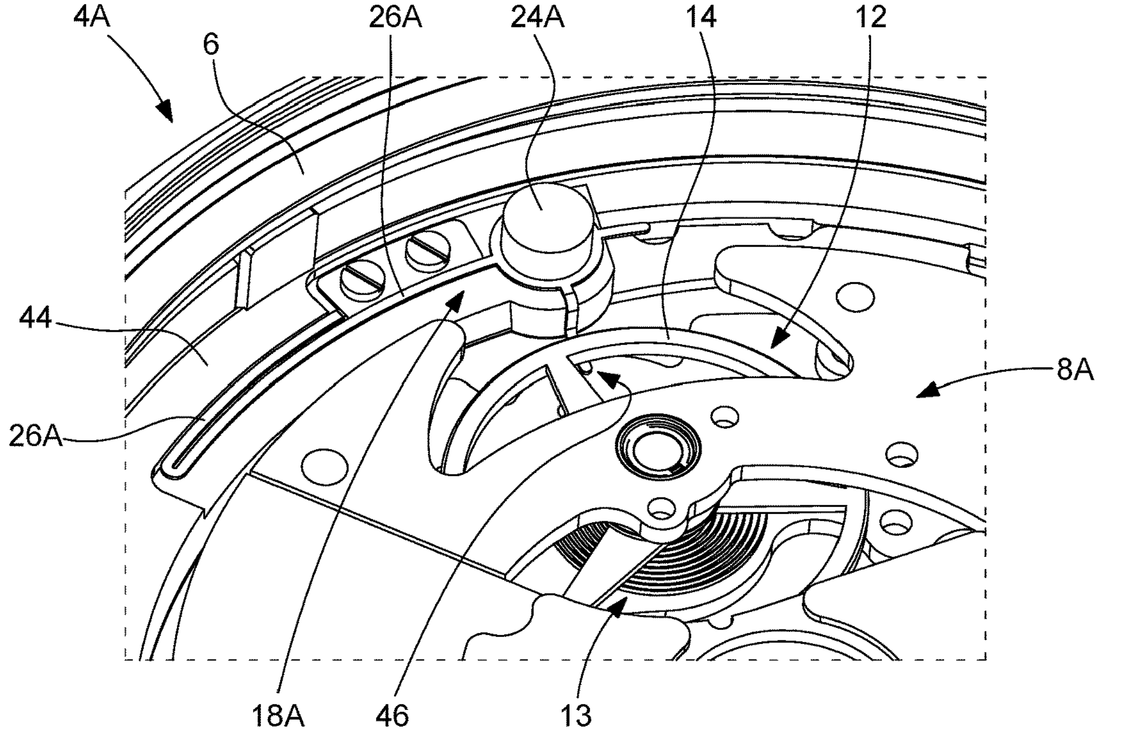

FIGS. 1 and 2 relate to a first embodiment. The timepiece assembly 2 comprises a watch 4, formed by a case 6 and a mechanical movement 8 incorporated into the case, and an external support formed by a box 22 for this watch. The mechanical movement comprises an analogue display 10 of the current time, a drive mechanism (not shown in FIG. 2) of this analogue display and a mechanical oscillator of which the mechanical resonator 12 is formed by a balance wheel 14 and an elastic return structure 13 (a spiral in FIG. 2, but flexible blades or other flexible structures can be provided alternatively), this mechanical oscillator being arranged to be able to set the running of the drive mechanism. The timepiece assembly 2 comprises a system 16 for correcting a time displayed by the analogue display, this correction system being carried out, on the one hand, by a mechanical device 18 incorporated into the case 6 and, on the other hand, by an electrical device 20 incorporated into the support external to the watch.

The electrical device 20 comprises a magnetic field generator formed by a coil 28 which is powered as a function of an electric control signal supplied by a control unit 30. The magnetic field generator, in particular the coil 28, and the case 6 are arranged in such a way that when the watch is placed on the support in a given position (FIG. 1), a magnetic field produced by the magnetic field generator can pass through the case, the material of which is selected for this purpose at least in the region of the case through which the magnetic field passes which is useful for the correction system.

The mechanical device 18 comprises a permanent magnet 24 and a flexible blade 26 supporting this permanent magnet in a region of a free end of this flexible blade, which is anchored to the watch movement at its other end (alternatively, the anchoring is provided on a caging circle or on an inner wall of the case 6). The mechanical device 18 is arranged in the watch such that it can periodically brake, from the action of a magnetic field generated by the electrical device and applied to the permanent magnet 24, the oscillating mechanical resonator or momentarily stop an oscillation of this mechanical resonator by exerting a mechanical force/pressure on the balance wheel. More particularly, in the first embodiment, the flexible blade 26 is arranged so as to be able to exert a force/pressure against an external lateral surface of the balance wheel 14, when the permanent magnet is subject to a radial magnetic force from the action of said magnetic field, and thus generate the periodic braking pulses or stop the mechanical resonator 12 during a determined time interval, which depends on the function to be performed. It should be noted that the box 22 has a part 34 against which the case 6 of the watch 4 placed in this box bears in a given position substantially laterally so that the correction system 16 is effective. The magnetic field generator, formed by the coil 28, and the case 6 are arranged in such a way that the magnetic field produced by this field generator can reach, from one side of the watch, the region where the permanent magnet 24 is located with sufficient intensity to be able to exert a radial magnetic force on this permanent magnet capable of generating, by means of the flexible blade, braking pulses which are applied to the oscillating mechanical resonator, namely on the external lateral surface of the balance wheel 14, or to momentarily stop an oscillation of the mechanical resonator from the radial force/pressure exerted by the mechanical device 18 on the mechanical resonator, which generates a force torque on the balance wheel via the frictional force (dry friction) between the flexible blade and said external lateral surface of the balance wheel.

The control unit 30 is arranged to produce an electric control signal as a function of a correction determined for the time displayed by the analogue display 10 and to supply this electric control signal to the magnetic field generator 28 so that it generates a corresponding magnetic field which activates the mechanical device 18 such that this mechanical device generates a series of braking pulses applied to the oscillating mechanical resonator or momentarily stops an oscillation of the mechanical resonator, so as to essentially make the determined correction of the displayed time. The box 22 can be powered with electricity via a cable 36 or via contactless power supply means. The model represented comprises a digital display 38 making it possible for example to provide various pieces of information, in particular the current date, the time zone or a date for switching from winter time to summer time and vice versa. Data input means can be provided in an area of the box. In an advantageous variant, the reading of the various data stored in an electronic part of the box (for example in the control unit 30) and also the transmission of data to this electronic part is provided via a wireless communication unit arranged in the box and enabling communication with a mobile phone which has an application for this purpose.

In the first embodiment, the box 22 comprises an electronic device for determining a correction to be made to the time displayed by the watch, i.e. to the analogue display 10. This electronic device includes a photographic device 40 comprising a photographic sensor formed by a matrix of photodetectors. Then, the electronic device comprises an image processing unit which is arranged to be able to determine the position of at least one specific hand of the analogue display 10 in an image taken by the photographic device 40. Finally, the electronic device comprises or is connected to a time base capable of providing an accurate current time and it further comprises a comparison unit for determining the correction to be made. In one embodiment, a mobile phone equipped with a suitable application is provided to take a photo of the analogue display of the watch 4, then to process the image as indicated above, and finally to determine a correction of the displayed time. This mobile phone then sends a correction signal via a wireless communication unit to the electronic unit of the box, indicating the correction to be made and possibly a time to start said correction or a time interval until the start of said correction.

FIGS. 3 to 5B relate to a second embodiment. The box 22A, apart from the arrangement of the electrical device 16A of the correction system, is similar to that of the first embodiment described above, and is not be described in more detail in the following. The timepiece assembly 42 differs from the first embodiment mainly in the arrangement of the correction system 16A with a mechanical device 18A arranged so that its permanent magnet 24A is mobile, from the action of an axial magnetic force, substantially in a direction parallel to the central axis of the watch 4A, this central axis being perpendicular to the dial of the analogue display and to the general plane of the back 48 of the case 6 (this back having been removed in FIGS. 3 and 4 to show the mechanical movement 8A inside the case). More specifically, the mechanical device 18A is formed by an elastic structure comprising a flexible blade 26A folded back on itself and anchored, at its first end, to a caging circle 44 surrounding the mechanical movement 8A. The flexible blade supports, at its second end which is free, a disc, onto which the permanent magnet 24A is adhered, and a finger 46 connected to the disc. The finger 46 is arranged so as to extend radially under the rim of the balance wheel 14, at a short distance from this rim.

The elasticity of the flexible blade 26A is designed to ensure a certain stability of the magnet 24A and of the finger 46 in the absence of a magnetic field for actuating this magnet and also good dynamic behaviour of the mechanical device 18A when an axial magnetic field 52 is generated by the electrical device 20A, this axial magnetic field making it possible to generate braking pulses by dry friction between the finger 46 and a circular upper surface of the balance wheel against which the finger is pressed briefly, which then applies pressure 54 on said upper circular surface. The finger this forms a braking pad of the balance wheel.

Figure 5A:
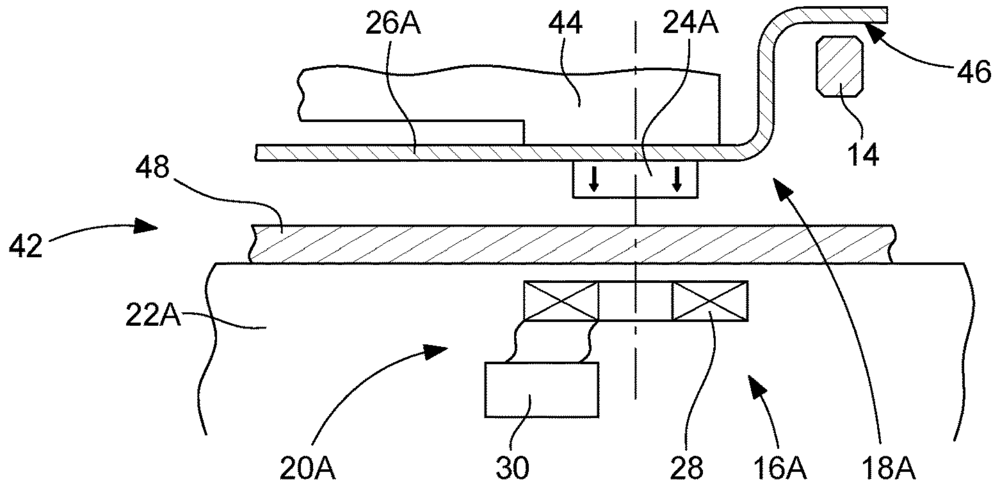
FIGS. 5A and 5B are schematic and partial cross-sections of the correction system of the second embodiment (FIGS. 3 and 4), these cross-sections showing the mechanical device forming the correction system, respectively in a position of rest and in a braking position of the balance wheel of the mechanical resonator incorporated into the mechanical movement.
Figure 5B:
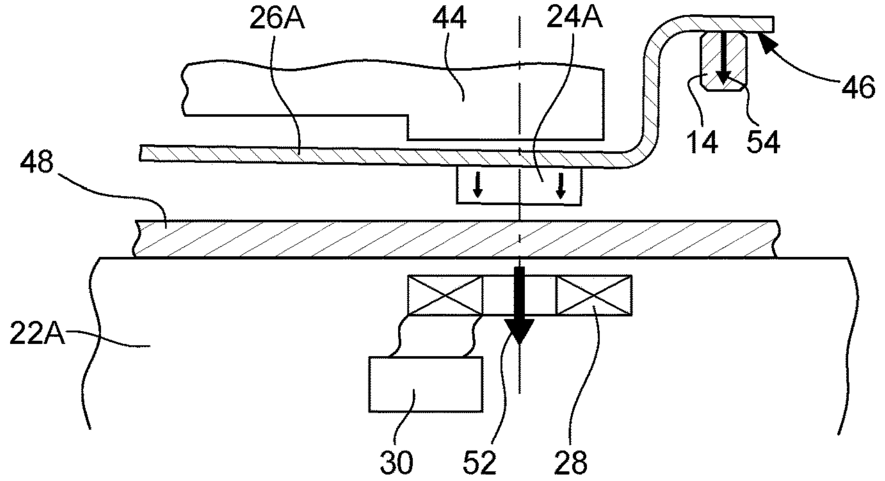

FIG. 5A shows the correction system 42 with the magnetic field generator inactive and the elastic blade 26A, bearing the permanent magnet 24A, in its position of rest, whereas FIG. 5B shows the correction system with the magnetic field generator (coil 28) generating a magnetic field 52 for actuating the mechanical device 18A and the elastic blade 26A supporting the permanent magnet 24A in its position of braking the balance wheel 14. According to the invention, the electrical device 20A is arranged in the support 22A and the mechanical device 18A is arranged in the watch 4A. When the watch is placed correctly in a given position on the support 22A, the axial magnetic field 52 passes through the back 48 of the case 6 and propagates into the region of the permanent magnet 24A on which it acts by magnetic attraction. The material of the back 48, at least in the region superimposed on the coil 28, is made from a non-magnetic material or a material conducting the magnetic field (with high magnetic permeability).

Figure 6:
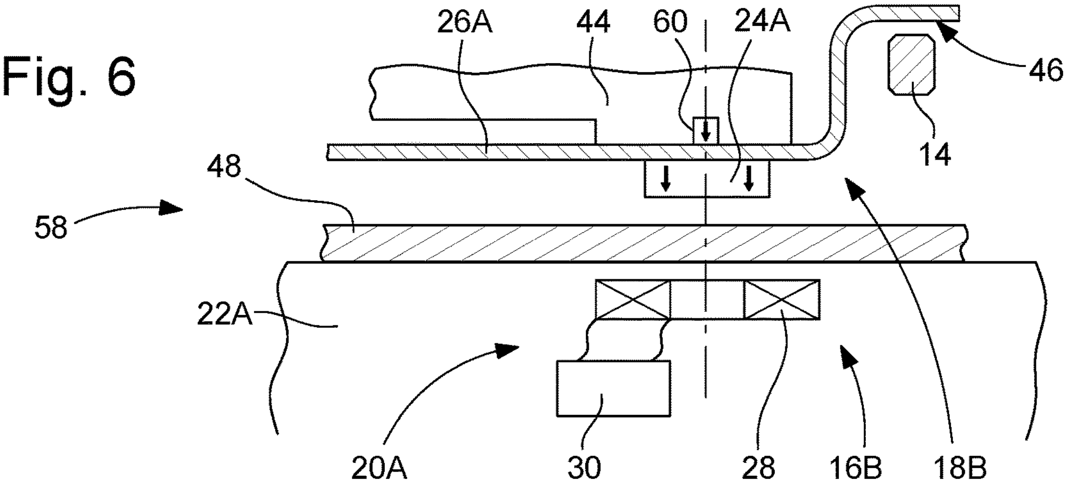
FIG. 6 shows an improved variant of the correction system of the second embodiment.

In an improved embodiment shown in FIG. 6 (which can also be provided in the first embodiment), the watch of the timepiece assembly 58 comprises, in the mechanical device 18B of the correction system 16B, a magnetic parking element which is arranged to as return, over at least a certain displacement distance of the permanent magnet 24A from a position of rest of the latter, the permanent magnet towards this position of rest in which it does not touch the balance wheel and in which it is normally held, in particular by the parking magnetic element, in the absence of the magnetic field produced by the magnetic field generator (coil). The aforementioned magnetic element is either a ferromagnetic positioning element or a positioning magnet 60 as shown in FIG. 6. This positioning magnet is configured to continuously exert a magnetic force in magnetic attraction on the permanent magnet 24A in its position of rest, with an intensity such that the positioning magnet can avoid, at least in the absence of shocks or strong accelerations of the watch, untimely braking pulses in the absence of the generation of the magnetic field 52 by the electrical device 20A, while guaranteeing that the magnetic field 52 generated by the coil 28 can easily overcome the force of attraction of the positioning magnet 60 to generate the braking pulses making it possible to carry out a specified correction of the displayed time. For this purpose, the coil 28 and its power supply, managed by the electronic control unit 30, are arranged in such a way that the magnetic field 52 has a sufficient strength.

In another embodiment, not shown, the magnetic field generator is a mobile permanent magnet or a fixed magnet associated with a mobile magnetic shield, the mobile magnet or the mobile magnetic shield being arranged in the support so as to be able to be displaced by an actuator to which the electric control signal is supplied, so as to vary the strength of the magnetic field supplied to said mechanical device as a function of the electric control signal.

Operating modes of the correction system according to the invention are described in the following.

According to a main operating mode, the control unit 30 of the electrical device, incorporated into the support, comprises a device for generating at least one frequency which is arranged so as to be able to generate a first periodic signal at a frequency FSUP. Then, the control unit is arranged to provide to the magnetic field generator, when the specified correction corresponds to a delay in the time displayed which is intended to be corrected and this correction therefore consists of advancing the display of the current time relative to a passage of time given by the undisturbed mechanical oscillator, a first control signal derived from the periodic first signal, during a first correction period, to activate the correction system so that it generates a first series of periodic braking pulses which are applied to the balance wheel of the mechanical resonator by the mechanical device at frequency FSUP. The duration of the first correction period and therefore the number of periodic braking pulses in said first series are determined by said delay to be corrected. The frequency FSUP is provided and the mechanical device incorporated into the watch is arranged such that the first series of periodic braking pulses at frequency FSUP can generate, during the first correction period, a first synchronous phase in which the oscillation of the mechanical resonator is synchronised to a correction frequency FSCor which is higher than a setpoint frequency F0c provided for the mechanical oscillator. The running of the mechanical movement is thus accelerated during the first correction period.

The person skilled in the art will find additional technical information relating to the main operating mode in document WO 2021/121711, and also in document EP 3629104. In these two documents, contrary to the present invention, the correction system is fully incorporated into the watch. Furthermore, in the second document, the watch comprises a sensor for itself detecting a temporal drift in the running of the mechanical oscillator and therefore of the timepiece movement. The teaching regarding the generating the various signals mentioned above and the periodic braking pulses, in the case of a delay to be corrected is similar however.

In a first particular operating mode, the device for generating at least one frequency is arranged so as also to be able to also generate a second periodic signal at a frequency FINF. Then the control unit is arranged to supply to the magnetic field generator, when the set correction corresponds to an advance in the displayed time which it is intended to correct and this correction thus consists in delaying the current time display relative to a passage of time given by the undisturbed mechanical oscillator, a second control signal derived from the second periodic signal, during a second correction period, to activate the correction system such that this correction system generates a second series of periodic braking pulses which are applied to the balance wheel by the mechanical device at frequency FINF. The duration of the second correction period and therefore the number of periodic braking pulses in said second series are determined by said advance to be corrected. The frequency FINF is provided and the mechanical device is arranged in such a way that the second series of periodic braking pulses at frequency FINF can generate, during the second correction period, a second synchronous phase in which the oscillation of the mechanical resonator is synchronised over a correction frequency FICor which is lower than the setpoint frequency F0c provided for the mechanical oscillator. The running of the mechanical movement is thus slowed down during the second correction period.

The person skilled in the art will find additional technical information relating to the first particular operating mode in document WO 2021/121711, and also in document EP 3629104.

According to second particular operating mode, the mechanical device of the correction system is arranged so as to be able to block the mechanical resonator by the action of a magnetic field, generated by the magnetic field generator, which is applied to the mobile magnetic element, so as to momentarily stop an oscillation of this mechanical oscillator during a correction period. The control unit is arranged so as to be able, when the determined correction corresponds to an advance in the displayed time and the correction to be made therefore consists of retarding the analogue display of the current time relative to a passage of time given by the undisturbed mechanical oscillator, to provide a third control signal to the magnetic field generator so that it activates the mechanical device such that this mechanical device blocks the oscillation of the mechanical resonator during the correction period which is determined by said advance to be corrected, so as to stop the running of said drive mechanism during this correction period. In the case of the correction systems described above, the blocking of the mechanical oscillator is performed by the elastic member 26, respectively 26A, bearing continuously on the rim of the balance wheel 14 during the correction period. To achieve this the magnetic field generator generates a continuous magnetic field during the correction period.

The person skilled in the art will also find additional technical information relating to the second particular operating mode in document WO 2021/121711. In an advantageous embodiment of the timepiece assembly according to the invention, the correction system is arranged so as to be able to correct the time displayed by 60 minutes overnight in order to adjust to summer time or winter time.

In a general embodiment of the timepiece assembly according to the invention, the control unit 30 is associated with an electronic device arranged to determine a correction to be made on a given date or as a function of the current time displayed by the watch. In a specific embodiment, the correction to be made is determined in a device external to the external support, in particular in a mobile phone comprising an application for this purpose.

The invention claimed is:

1. A timepiece assembly comprising:

a watch, formed by a case and a mechanical movement incorporated into the case, and a support which is external to the watch and arranged to be able to support at least the case of said watch, the mechanical movement comprising an analogue time display, a drive mechanism for said analogue display and a mechanical oscillator comprising a mechanical resonator formed by a balance wheel and an elastic return structure, said mechanical oscillator being arranged so as to be able to set the running of the drive mechanism, the timepiece assembly comprising a correction system for correcting a time displayed by the analogue display, wherein the correction system is formed by a mechanical device incorporated into the case and by an electrical device incorporated into the support, the mechanical device comprising a mobile magnetic element and being arranged in the watch so as to be able to brake the oscillating mechanical resonator or momentarily stop an oscillation of said mechanical resonator by exciting the mobile magnetic element with a magnetic field supplied by a magnetic field generator of the electrical device, said magnetic field generator and the case being arranged in such a way that when the case is placed on the support in a given position the magnetic field produced by the magnetic field generator can pass through the case and reach the region where the mobile magnetic element is located so as to excite said mobile magnetic element in order to generate, via the mechanical device, braking pulses which are applied to the oscillating mechanical resonator or to momentarily stop an oscillation of the mechanical resonator with the mechanical device, and wherein the electrical device comprises a control unit which is arranged so as to be able to produce an electrical control signal as a function of a correction determined for the time displayed by the analogue display and to supply said electric control signal to the magnetic field generator so that it generates a corresponding magnetic field which activates the mechanical device such that said mechanical device generates a series of braking pulses which are applied to the oscillating mechanical resonator or momentarily stops an oscillation of said mechanical resonator, so as to substantially carry out the determined correction of the displayed time.

2. The timepiece assembly according to claim 1, wherein the magnetic field generator is a coil powered as a function of said electric control signal.

3. The timepiece assembly according to claim 1, wherein the magnetic field generator is a mobile permanent magnet or a fixed magnet associated with a mobile magnetic shield, the mobile magnet or the mobile magnetic shield being arranged so as to be displaceable by an actuator to which said electric control signal is supplied so as to vary the strength of the magnetic field applied to said mechanical device as a function of the electric control signal.

4. The timepiece assembly according to claim 1, wherein said mobile magnetic element is a permanent magnet, the mechanical device being formed by a flexible blade supporting the permanent magnet in the region of a free end, said flexible blade being arranged so as to be able to exert pressure against a surface of said balance wheel from the action of said magnetic field and thus to generate said braking pulses or momentarily stop the mechanical resonator.

5. The timepiece assembly according to claim 4, wherein the watch further comprises a magnetic parking element which is arranged to recall the mobile magnetic element, over at least a certain displacement distance of said mobile magnetic element, towards a position of rest in which the mobile magnetic element leaves the mechanical resonator free and in which it is normally held in the absence of said magnetic field, which is sufficiently strong to be able to overcome the restoring force of the magnetic parking element and to generate said braking pulses of the oscillating mechanical resonator or momentarily stop an oscillation of the mechanical resonator.

6. The timepiece assembly according to claim 1, wherein the control unit comprises a device for generating at least one frequency, which is arranged to as to be able to generate a first periodic signal at a frequency FSUP, in that the control unit is arranged to supply to the magnetic field generator, when the determined correction corresponds to a delay in the displayed time which it is intended to correct, a first control signal derived from the first periodic signal, during a first correction period, to activate the correction system so that said correction system generates a first series of periodic braking pulses which are applied to the mechanical resonator by the mechanical device at frequency FSUP, the duration of the first correction period and therefore the number of periodic braking pulses in said first series being determined by said delay to be corrected, and wherein the frequency FSUP is provided and the mechanical device is arranged such that the first series of periodic braking pulses at frequency FSUP can generate, during the first correction period, a first synchronous phase wherein the oscillation of the mechanical resonator is synchronised to a correction frequency FSCor which is higher than a setpoint frequency F0c provided for the mechanical oscillator.

7. The timepiece assembly according to claim 6, wherein the device for generating at least one frequency is arranged so as to be able to additionally generate a second periodic signal at a frequency FINF, in that the control unit is arranged to supply to the magnetic field generator, when the determined correction corresponds to an advance in the displayed time which it is intended to correct, a second control signal derived from the second periodic signal, during a second correction period, to activate the correction system so that said correction system generates a second series of periodic braking pulses which are applied to the mechanical resonator by the mechanical device at frequency FINF, the duration of the second correction period and therefore the number of periodic braking pulses in the second series being determined by said advance to be corrected, and wherein the frequency FINF is provided and the mechanical device is arranged such that the second series of periodic braking pulses at frequency FINF can generate, during the second correction period, a second synchronous phase wherein the oscillation of the mechanical resonator is synchronised to a correction frequency FICor which is lower than the setpoint frequency F0c provided for the mechanical oscillator.

8. The timepiece assembly according to claim 6, wherein the mechanical device is arranged so as to be able to also block the mechanical resonator from the action of the magnetic field generated by the magnetic field generator, which is applied to said mobile magnetic element, so as to momentarily stop an oscillation of the mechanical resonator during a correction period, and wherein the control unit is arranged so as to be able, when the determined correction corresponds to an advance in the displayed time, to provide a third control signal to the magnetic field generator so that it activates the mechanical device so that the latter blocks the oscillation of the mechanical resonator during the correction period which is determined by said advance to be corrected, so as to stop the running of said drive mechanism during said correction period.

9. The timepiece assembly according to claim 1, wherein said control unit is associated with an electronic device to determine the determined correction to be made, defining said determined correction, on a given date or as a function of the current time displayed by the watch.

10. The timepiece assembly according to claim 9, wherein said support is a box, a casket, or a display case, in that the support comprises said electronic device for determining the determined correction to be made, said electronic device comprising or being associated with a photographic device which comprises a photographic sensor formed by a matrix of photodetectors, in that said electronic device comprises an image processing unit which is arranged to be able to determine the position of at least one specified hand of said analogue display in an image taken by the photographic device, and wherein said electronic device comprises or is connected to a time base capable of providing an accurate current time and further comprises a comparison unit for determining the determined correction to be made.

* * * * *